United States Patent [19]

Itoh et al.

[11] 3,950,299

[45] Apr. 13, 1976

[54] HEAT-CURABLE SILICONE RUBBER COMPOSITIONS

[75] Inventors: Kunio Itoh; Naoyoshi Kuga; Takeshi Fukuda, all of Annaka, Japan

[73] Assignee: Shin-Etsu Chemical Co., Ltd, Tokyo, Japan

[22] Filed: Apr. 1, 1975

[21] Appl. No.: 563,978

[30] Foreign Application Priority Data

Apr. 2, 1974 Japan.............................. 49-37132

[52] U.S. Cl............................. 260/37 SB; 260/825
[51] Int. Cl.$^2$......................................... C08L 83/04
[58] Field of Search........................ 260/37 SB, 825

[56] References Cited
UNITED STATES PATENTS 3,328,323  6/1967  Vaughn........................ 260/825 X

*Primary Examiner*—Lewis T. Jacobs
*Attorney, Agent, or Firm*—Toren, McGeady and Stanger

[57] ABSTRACT

Silicone rubber compositions comprising a diorganopolysiloxane having localized vinyl group distribution, a silica filler with large specific surface area and a curing agent, e.g., an organic peroxide, the diorganopolysiloxane being prepared by the block-copolymerization of a hydroxy-endblocked diorganopolysiloxane without unsaturation and a chlorine-endblocked vinyl-containing diorganopolysiloxane by the dehydrochlorination-condensation. Cured elastomers from silicone rubber compositions have very much improved tear strength with the other properties being as good as those of the conventional silicone rubber elastomers.

9 Claims, No Drawings

HEAT-CURABLE SILICONE RUBBER COMPOSITIONS

FIELD OF THE INVENTION

This invention relates to a novel silicone rubber composition and, in particular, to a heat-curable silicone rubber composition capable of giving a silicone elastomer with very high tear strength, low compression set, high abrasion resistance and low tension set.

DESCRIPTION OF THE PRIOR ART

Silicone elastomers possess in general, several excellent properties, such as, electric insulation, thermal stability and weathering resistance while, on the other hand, they are defective in their relatively low tear strength in comparison with other synthetic rubbers.

Thus, extensive investigational efforts have been directed to the improvement of tear strength of silicone elastomers. For example, a method was proposed in which part of the organic groups, substantially all of the remaining groups being methyl groups, in the diorganopolysiloxane gum which is the main component of silicone rubber compositions, are replaced by phenyl groups in order to enhance the tear strength of the resulting silicone elastomers. While the silicone elastomers obtained by the method of partial replacement of the methyl groups by phenyl groups have somewhat improved tear strength, several adverse effects are introduced by the method, such as, a lowering in their elasticity as well as a remarkable increase in the compression set and lowering of the resistance against oils.

Alternatively, utilizaton of siliceous reinforcing fillers with very large specific surface areas of 300 m²/g or larger was proposed to improve the tear strength of silicone elastomers although the method can give a tear strength at best of 20 kg/cm which is far from satisfactory.

Still another one of the heat-curable silicone rubber compositions capable of giving cured elastomers with improved tear strength thus far proposed in the art comprises a diorganopolysiloxane with a polymerization degree higher than 3,000 in which 0.02 to 0.2 mole % of the diorganosiloxane units have vinyl groups directly bonded to the silicon atoms, a diorganopolysiloxane with a polymerization degree higher than 100 in which at least 2 mole % of the diorganosiloxane units have vinyl groups directly bonded to the silicone atoms, and a siliceous reinforcing filler with a specific surface area larger than 150 m²/g. (See U.S. Pat. No. 3,652,475.) The silicone elastomers obtained from the composition as described herein, however, have several defects, such as, high compression set, high tension set and low abrasion resistance.

OBJECT OF THE INVENTION

The object of this invention is to present a heat-curable silicone rubber composition capable of giving silicone elastomers with very high tear strength and which are free from the above-described defects.

SUMMARY OF THE INVENTION

The invention relates to a heat-curable silicone rubber composition which comprises i. 100 parts by weight of a diorganopolysiloxane with a polymerization degree higher than 3,000 produced by the dehydrochlorination-condensation between (a) a diorganopolysiloxane with a polymerization degree higher than 500 expressed by the general formula

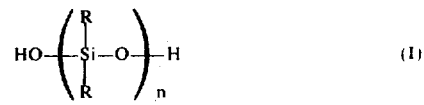

wherein R is a substituted or unsubstituted saturated monovalent hydrocarbon group and n is a positive integer, and (b) a diorganopolysiloxane with a polymerization degree higher than 50 expressed by the general formula

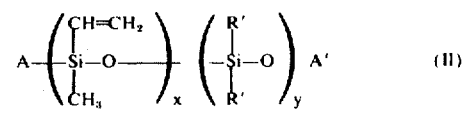

wherein R' is a substituted or unsubstituted saturated monovalent hydrocarbon group, A is a halogen atom or a diorganohalogenosiloxy group, A' is a diorganohalogenosilyl group and $x$ and $y$ each are positive integers with the proviso that $x/(x+y) = 0.05$, in an amount of more than 0.9 mole per mole of the above-mentioned diorganopolysiloxane (a), ii. from 20 to 200 parts by weight of a siliceous filler with a specific surface area larger than 150 m²/g, and iii. a catalytic amount of a curing agent.

DETAILED DESCRIPTION OF THE INVENTION

To further describe the invention, the diorganopolysiloxane as the reactant (a) above expressed by the general formula (I) has hydroxy groups bonded to the terminal silicon atoms at both chain ends and the symbol R in the formula (I) denotes a substituted or unsubstituted saturated monovalent hydrocarbon group, such as, alkyl groups exemplified by methyl, ethyl and propyl groups and aryl groups exemplified by phenyl group and the halogen-substituted derivatives thereof. The diorganopolysiloxane (a) is obtained by the polymerization of one or more of the cyclic polysiloxanes, such as, octamethylcyclotetrasiloxane, octaphenylcyclotetrasiloxane and tetramethyltetraphenylcyclotetrasiloxane in the presence of a small amount of water.

The diorganopolysiloxane as the reactant (b) above expressed by the general formula (II) contains more than 5 mole % of methylvinylsiloxane units and is terminated by halogen atoms at both chain ends. The symbol R' in the formula has the same meaning as the symbol R above. The symbol A denotes a halogen atom, such as, chlorine and bromine atoms or a diorganohalogenosiloxy group, such as, dimethylchlorosiloxy and methylvinylchlorosiloxy groups and A' denotes an diorganohalogenosilyl group, such as, dimethylchlorosilyl and methylvinylchlorosilyl groups. The diorganopolysiloxane (b) is obtained, for example, by the polymerization of a mixture of tetramethyltetravinylcyclotetrasiloxane and octamethylcyclotetrasiloxane with or without the octaphenylcyclotetrasiloxane in the presence of small amounts of dimethyldichlorosilane.

The diorganopolysiloxane as component (i) with a polymerization degree higher than 3,000 as the main component in the composition of the present invention is obtained by the dehydrochlorination-condensation between the diorganopolysiloxane (a) expressed by the general formula (I) containing terminal hydroxy groups at both chain ends and the diorganopolysiloxane (b) expressed by the general formula (II) containing terminal halogen atoms at both chain ends according to known methods in which the dehydrochlorination is carried out in the presence of an acid acceptor, such as, pyridine, picoline, morpholine, tributylamine and anhydrous ammonia followed, if necessary, by hydration. The requisite limitations in order to have satisfactorily improved mechanical properties, such as, rubber-like elasticity, tear strength and tensile strength exhibited by the elastomers obtained by curing the rubber composition of the present invention are that the polymerization degree of the diorganopolysiloxane (a) is higher than 500, that the polymerization degree of the diorganopolysiloxane (b) is higher than 50, that more than 5 mole % of the diorganosiloxane units in the diorganopolysiloxane (b) are methylvinylsiloxane units, that the reaction ratio of the diorganopolysiloxanes (a) and (b) is in the range of more than 0.5 moles of (b) per mole of (a) and that the polymerization degree of the diorganopolysiloxane obtained by the dehydrochlorination-condensation between the diorganopolysiloxanes (a) and (b) is higher than 3,000.

The diorganopolysiloxane (i) has, presumably, a block structure in which blocks each composed of $x$ units of

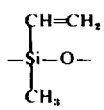

and $y$ units of

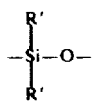

linked in random sequence and blocks each composed of $n$ units of

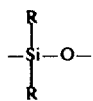

are alternately linked together to form a block copolymer with a localized distribution of the vinyl groups. When the diorganopolysiloxane obtained by the dehydrochlorination-condensation between the diorganopolysiloxanes (a) and (b) has unreacted terminal halogen atoms directly bonded to the silicon atoms at chain ends, the rubber compositions formulated with the diorganopolysiloxane, as such, result in the inferior properties of the silicone elastomers obtained from them and it is advisable that the terminal halogen atoms bonded to the silicon atoms are converted to hydroxy groups by the hydration treatment as is well known in the art.

The heat-curable silicone rubber composition of the present invention is prepared by blending 100 parts by weight of the diorganopolysiloxane with a polymerization degree higher than 3,000 obtained by the dehydrochlorination-condensation between the diorganopolysiloxanes (a) and (b), from 20 to 200 parts by weight of a siliceous reinforcing filler with the specific surface area larger than 150 m²/g and a catalytic amount of a curing agent. The siliceous reinforcing filler may be any one of the conventional fillers employed in the prior art for the formulation of silicone rubber compositions, such as, fume silica, precipitated silica and fine-powdered quartz, but it is necessary that the filler has a specific surface area of larger than 150 m²/g. Specific surface area smaller than 150 m²/g results in the poorer mechanical properties of the cured elastomers.

The curing agent suitable for the purpose is an organic peroxide as is conventional in the prior art for the silicone rubber formulations and exemplified by bis(2,4-dichlorobenzoyl)peroxide, benzoylperoxide, dicumylperoxide, dichlorobenzoylperoxide, t-butylperbenzoate and 2,5-dimethyl-2,5-di(t-butylperoxy)-hexane. The organic peroxide is used in an amount of from 0.1 to 10 parts by weight per 100 parts by weight of the diorganopolysiloxane as component (i).

Various additives known in the art can be incorporated optionally in the silicone rubber composition of the present invention, which include organosilanes, organopolysiloxanes and organopolysilazanes exemplified by diphenylsilanediol, dimethylpolysiloxanes with low polymerization degree terminated by silanol groups and hexamethyldisilazane, respectively, pigments, such as, iron oxide and carbon black, and thermal stability improvers, such as, ceric oxide.

The siliceous reinforcing filler as specified above may be employed in combination with other inorganic fillers, such as, clay, calcium carbonate, diatomaceous earth, titanium dioxide.

The component (i) of the silicone rubber composition of the invention may be a mixture of the diorganopolysiloxane as defined above and a conventional diorganopolysiloxane gum having a polymerization degree higher than 3,000, including dimethylpolysiloxane gum containing 0.2 mole % or more of the vinyl groups bonded to a silicon atom in its molecule, that are as the main component to make silicone rubber compositions in the prior art, the mixing ratio being 1:2 by weight at the most. It is advisable in such a case that the diorganopolysiloxane contains relatively large numbers of methylvinylsiloxane units. The conventional diorganopolysiloxane gum, different from the diorganopolysiloxane of this invention having a block structure, has a random structure in which different kinds of the diorganosiloxane units are linked together in random sequence.

Completely cured silicone elastomers are obtained from the composition of the present invention by the primary curing at 100° to 400°C under or without pressure for 30 seconds to 1 hour followed, optionally, by the secondary curing at 150° to 200°C for 2 to 24 hours. The silicone elastomers thus obtained are excellent in the mechanical properties, such as, the tear strength as high as 50 kg/cm, as well as the low compression set, high abrasion resistance and low tension set and are useful in various fields of applications, such as, covered wires and rubber belts.

The following examples are to illustrate the present invention and parts in the examples are all parts by weight.

EXAMPLE 1.

Into a mixture of 65.9 parts of octamethylcyclotetrasiloxane, 8.6 parts of tetramethyltetravinylcyclotetrasiloxane and 1.3 parts of dimethyldichlorosilane was added dropwise 0.26 part of fuming sulfuric acid and the polymerization reaction was allowed to proceed for 2 hours at 30°C and for a further 20 hours at 50°C to give a diorganopolysiloxane (a-1) with an average polymerization degree of 100 terminated at both chain ends by chlorine atoms directly bonded to the silicon atoms and composed of 10 mole % of methylvinylsiloxane units and 90 mole % of dimethylsiloxane units.

Into 100 parts of a hydroxy-endblocked dimethylpolysiloxane with a polymerization degree of about 8,000 admixed with 0.6 part of pyridine was added dropwise 7.7 parts of the diorganopolysiloxane (a-1) above with stirring to have the dehydrochlorination-condensation take place and the reaction was completed by continued stirring for an additional 30 minutes at room temperature. After completion of the reaction, the mixture was neutralized and washed with water and isopropanol successively to give a diorganopolysiloxane (b-1) with a polymerization degree of about 8,200 terminated by silanolic hydroxy groups at both chain ends and composed of 99.756 mole % of dimethylsiloxane units and 0.244 mole % of methylvinylsiloxane units.

A silicone rubber composition was prepared by blending in a kneader 100 parts of the diorganopolysiloxane (b-1) obtained above, 45 parts of fume silica with the specific surface area of 200 m²/g, 0.7 part of diphenylsilanediol, 1 part of a hydroxy-endblocked dimethylpolysiloxane fluid with the viscosity of 20 cS at 25°C and 2 parts of hexamethyldisilazane followed by the addition of 0.5 part of 2,5-dimethyl-2,5-di(t-butylperoxy)hexane after a heat treatment at 160°C for 2 hours.

The rubber composition thus obtained was processed by first curing under pressure of 30 kg/cm² at 170°C for 10 minutes followed by heating at 200°C for 4 hours into a sheet of 2 mm thickness with the mechanical properties determined in accordance with JIS C 2123 as shown below.

| | |
|---|---|
| Hardness | 49 |
| Elongation, % | 610 |
| Tensile strength, kg/cm² | 94 |
| Tear strength, kg/cm | 38 |

The tear strength of the cured sheet dropped to 28 kg/cm by further heating at 250°C for 24 hours.

EXAMPLE 2.

Into a mixture of 58.5 parts of octamethylcyclotetrasiloxane, 17.2 parts of tetramethyltetravinylcyclotetrasiloxane and 1.3 parts of dimethyldichlorosilane was added dropwise 0.26 part of fuming sulfuric acid to have the reaction take place resulting in a diorganopolysiloxane (a-2) with a polymerization degree of about 100 terminated by chlorine atoms directly bonded to the silicon atoms at both chain ends and composed of 20 mole % of methylvinylsiloxane units and 80 mole % of dimethylsiloxane units.

Into 100 parts of a hydroxy-endblocked dimethylpolysiloxane with a polymerization degree of about 8,000 admixed with 0.8 part of pyridine was added dropwise 7.8 parts of the diorganopolysiloxane (a-2) obtained above and the mixture was further stirred for 30 minutes at room temperature to have the dehydrochlorination-condensation take place giving a diorganopolysiloxane (b-2) with a polymerization degree of about 8,200 terminated by silanolic hydroxy groups at both chain ends and composed of 99.512 mole % of dimethylsiloxane units and 0.488 mole % of methylvinylsiloxane units.

A silicone rubber composition was prepared by blending in a kneader, 100 parts of the diorganopolysiloxane (b-2) above, 45 parts of a fume silica with the specific surface area of 200 m²/g, 0.7 part of diphenylsilanediol, 1 part of a hydroxy-endblocked dimethylpolysiloxane fluid with a viscosity of 20 cS at 25°C and 2 parts of hexamethyldisilazane followed by the addition of 0.5 part of 2,5-dimethyl-2,5-di(t-butylperoxy)-hexane after a heat treatment at 160°C for 2 hours.

The rubber composition thus prepared was processed by first curing under pressure of 30 kg/cm² at 170°C for 10 minutes into a sheet of 2 mm thickness followed by heating at 200°C for 4 hours. The mechanical properties of the sheet thus obtained are shown below, as determined in accordance with JIS C 2123.

| | |
|---|---|
| Hardness | 53 |
| Elongation, % | 480 |
| Tensile strength, kg/cm² | 82 |
| Tear strength, kg/cm | 47 |

The tear strength of the cured sheet dropped to 31 kg/cm by further heating at 250°C for 24 hours.

CONTROL 1.

A hydroxy-endblocked diorganopolysiloxane (a-3) with a polymerization degree of 20 composed of 40 mole % of methylvinylsiloxane units and 60 mole % of dimethylsiloxane units was prepared in the same manner as in Example 1.

Into 100 parts of a hydroxy-endblocked dimethylpolysiloxane with a polymerization degree of about 8,000 admixed with 1.6 parts of pyridine was added dropwise, 3.3 parts of the diorganopolysiloxane (a-3) obtained above and mixing was continued for further a 30 minutes at room temperature to have the reaction take place resulting in a hydroxy-endblocked diorganopolysiloxane (b-3) with a polymerization degree of about 8,040 composed of 99.801 mole % of dimethylsiloxane units and 0.199 mole % of methylvinylsiloxane units.

A rubber composition was prepared similarly as in Example 1 with the diorganopolysiloxane (b-3) instead of (b-1) and the composition was processed into a cured sheet with the properties as shown below.

| | |
|---|---|
| Hardness | 45 |
| Elongation, % | 530 |
| Tensile strength, kg/cm² | 84 |
| Tear strength, kg/cm | 23 |

CONTROL 2.

A rubber composition was prepared replacing the diorganopolysiloxane (a-3) in Control 1 with a chlorine-endblocked diorganopolysiloxane (a-4) with a polymerization degree of about 20 composed of 20 mole % of methylvinylsiloxane units and 80 mole % of dimethylsiloxane units in a similar way including the dehydrochlorination-condensation and the composition was processed into a cured sheet with the properties as shown below.

| Hardness | 46 |
|---|---|
| Elongation, % | 400 |
| Tensile strength, kg/cm² | 86 |
| Tear strength, kg/cm | 26 |

CONTROL 3.

A rubber composition was prepared similarly as in Example 2 with a hydroxy-endblocked diorganopolysiloxane with a polymerization degree of about 8,000 composed of 99.96 mole % of dimethylsiloxane units and 0.04 mole % of methylvinylsiloxane units instead of the diorganopolysiloxane (b-2) in Example 2 and the composition was processed into a cured sheet with the properties as shown below.

| Hardness | 50 |
|---|---|
| Elongation, % | 650 |
| Tensile strength, kg/cm² | 91 |
| Tear strength, kg/cm | 27 |

CONTROL 4.

A rubber composition was prepared similarly as in Example 2 with a hydroxy-endblocked diorganopolysiloxane with a polymerization degree of about 8,000 composed of 99.85 mole % of dimethylsiloxane units and 0.15 mole % of methylvinylsiloxane units instead of the diorganopolysiloxane (b-2) in Example 2 and the composition was processed into a cured sheet with the properties as shown below.

| Hardness | 50 |
|---|---|
| Elongation, % | 460 |
| Tensile strength, kg/cm² | 78 |
| Tear strength, kg/cm | 24 |

EXAMPLE 3.

Into 100 parts of a hydroxy-endblocked dimethylpolysiloxane with a polymerization degree of about 800 admixed with 3.0 parts of pyridine was added dropwise 20.8 parts of the diorganopolysiloxane (a-2) employed in Example 2 and mixing was continued for a further 12 minutes to have the reaction take place resulting in a diorganopolysiloxane (b-4) composed by the siloxane units as expressed by the following formula

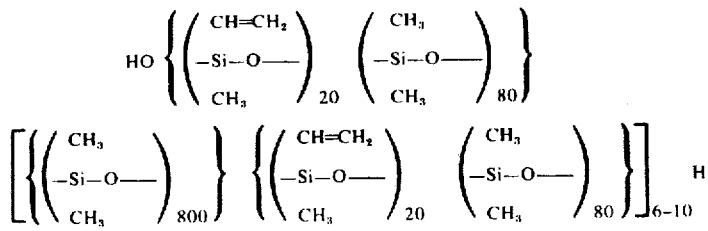

where the blocks composed of 20 units of methylvinylsiloxane and 80 units of dimethylsiloxane in random sequence and the blocks composed of about 800 units of dimethylsiloxane are alternatively linked together by from 6 to 10 repetitions, the blocks locating at the chain ends being the blocks of the former type.

A rubber composition was prepared by blending in a kneader 40 parts of the diorganopolysiloxane (b-4) above, 60 parts of a hydroxy-endblocked dimethylpolysiloxane with a polymerization degree of about 8,000, 45 parts of a fume silica with the specific surface area of 200 m²/g, 0.7 part of diphenylsilanediol, 1 part of a hydroxy-endblocked dimethylpolysiloxane fluid with the viscosity of 20 cS at 25°C and 2 parts of hexamethyldisilazane.

The rubber composition obtained above was processed similarly as in Exaple 1 into a cured sheet with the properties as shown below.

| Hardness | 50 |
|---|---|
| Elongation, % | 470 |
| Tensile strength, kg/cm² | 87 |
| Tear strength, kg/cm | 41 |

What is claimed is:

1. A heat-curable silicone rubber composition which comprises
    i. 100 parts by weight of a diorganopolysiloxane with a polymerization degree higher than 3,000 produced by the dehydrochlorination-condensation between (a) a diorganopolysiloxane with a polymerization degree higher than 500 expressed by the general formula

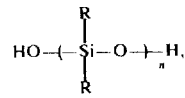

where R is a substituted or unsubstituted saturated monovalent hydrocarbon group and $n$ is a positive integer, and (b) a diorganopolysiloxane with a polymerization degree higher than 50 expressed by the general formula

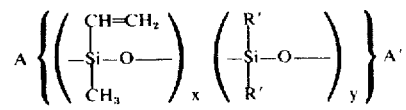

where R' is a substituted or unsubstituted saturated monovalent hydrocarbon group, A is a halogen atom or a diorganohalogenosiloxy group, A' is a diorganohalogenosilyl group and $x$ and $y$ each are positive integers with the proviso that $x/(x+y) = 0.05$, in an amount of more than 0.9 mole per mole of diorganopolysiloxane (a),
  ii. from 0 to 200 parts by weight of a diorganopolysiloxane gum having a random structure with a polymerization degree higher than 3,000,
  iii. from 20 to 200 parts by weight, based on 100 parts by weight of components (i) and (ii), of a siliceous filler with a specific surface area larger than 150 m²/g, and
  iv. a catalytic amount of a curing agent.

2. The heat-curable silicone rubber composition as claimed in claim 1 wherein R is a methyl group.

3. The heat-curable silicone rubber composition as claimed in claim 1 wherein R' is a methyl group.

4. The heat-curable silicone rubber composition as claimed in claim 1 wherein A is a dimethylchlorosiloxy or methylvinylchlorosiloxy group or a chlorine atom.

5. The heat-curable silicone rubber composition as claimed in claim 1 wherein A' is a dimethylchlorosilyl or methylvinylchlorosilyl group.

6. The heat-curable silicone rubber composition as claimed in claim 1 wherein said diorganopolysiloxane gum is a dimethylpolysiloxane gum.

7. The heat-curable silicone rubber composition as claimed in claim 1 wherein said diorganopolysiloxane gum is a dimethylpolysiloxane gum having no more than 0.2 mole % of vinyl groups bonded to a silicon atom in one molecule.

8. The heat-curable silicone rubber composition as claimed in claim 1 wherein said curing agent is an organic peroxide.

9. The heat-curable silicone rubber composition as claimed in claim 8 wherein said organic peroxide is used in an amount of from 0.1 to 10 parts by weight based on 100 parts by weight of component (i).

* * * * *